US006722558B2

(12) United States Patent  
Smith et al.

(10) Patent No.: US 6,722,558 B2
(45) Date of Patent: Apr. 20, 2004

(54) METHOD OF SOLDERING METALLIC TERMINALS

(75) Inventors: Dean Smith, Gerlingen (DE); James Frey, Summerville, SC (US); Richard Kidd, Mt. Pleasant, SC (US); Andreas Herrmann, Charleston, SC (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/209,180

(22) Filed: Jul. 31, 2002

(65) Prior Publication Data

US 2004/0020975 A1 Feb. 5, 2004

(51) Int. Cl.⁷ .......................... B23K 1/005; B23K 31/02
(52) U.S. Cl. ................. 228/212; 228/244; 228/247; 228/253; 228/180.1; 219/121.66
(58) Field of Search ................. 228/212, 244, 228/245–247, 253, 179.1, 180.1, 180.2; 219/121.6–121.86

(56) References Cited

U.S. PATENT DOCUMENTS

| 1,915,946 A | | 6/1933 | Ost |
| 3,665,367 A | | 5/1972 | Keller et al. |
| 3,828,706 A | | 8/1974 | Scott |
| 4,044,460 A | * | 8/1977 | Schachter ................ 29/842 |
| 4,050,621 A | * | 9/1977 | Bouley .................... 228/180.1 |
| 4,306,217 A | | 12/1981 | Solow |
| 4,926,022 A | * | 5/1990 | Freedman ............... 219/121.63 |
| 5,270,492 A | | 12/1993 | Fukui |
| 5,288,959 A | * | 2/1994 | Henschen ................ 219/616 |
| 5,373,985 A | * | 12/1994 | Chiba et al. ............. 228/180.1 |
| 6,053,395 A | | 4/2000 | Sasaki |
| 6,109,506 A | | 8/2000 | Blair et al. |
| 6,502,740 B2 | * | 1/2003 | Matsudome ............. 228/180.1 |

* cited by examiner

Primary Examiner—Kiley Stoner
(74) Attorney, Agent, or Firm—Michael Best & Friedrich LLP

(57) ABSTRACT

A system and method of joining together first and second electric terminals includes providing the second terminal with an aperture extending therethrough and a notch therein. The first and second terminals are positioned in overlapping relationship with one another so the aperture overlaps the first terminal to provide access to the first terminal through the second terminal, and so the notch overlaps the first terminal. Heat is applied to the first terminal through the aperture in the second terminal to heat the first and second terminals. The end of a solder wire is positioned in engagement with the notch of the heated second terminal to locate the solder wire with respect to the terminals and to melt the solder wire to form a solder pool that contacts the first and second terminals.

32 Claims, 3 Drawing Sheets

METHOD OF SOLDERING METALLIC TERMINALS

FIELD OF THE INVENTION

The invention relates generally to a method of soldering, and more particularly to a method of soldering together metallic terminals, such as those found in a fuel injector.

BACKGROUND OF THE INVENTION

Soldering has long been used for joining together metallic components. In its basic practice, at least two metallic components to be joined are heated to an elevated temperature. The components must be heated to the required temperature such that the solder wire melts upon contact with the heated components. As the solder wire melts, it begins to flow and exhibits a "wetting" behavior as the flow moves along the surfaces of the joined components. Often, the quality of the soldered joint is dependent upon the wetting behavior of the solder flow. More specifically, the mechanical and electrical properties of the soldered joint are dependent upon achieving the proper wetting behavior of the solder flow.

SUMMARY OF THE INVENTION

For optimum solder flow, the components to be joined should be simultaneously and as evenly heated as possible. As a result, temperature gradients within and between the components are decreased and the temperature distribution within and between the components is substantially homogeneous.

Contact-type soldering techniques often do not yield a substantially homogeneous temperature distribution within and between the components to be joined. Such contact-type soldering techniques can include using a soldering iron or a similar tool to apply heat via a direct point contact to the components to be joined. Typically, the portion of the component in direct contact with the tip of the soldering iron has the highest temperature, while the portion of the component farthest from the point of contact with the soldering iron has the lowest temperature. The difference in temperature within and between the components to be joined yields a temperature gradient that can have a negative effect on the solder flow and the quality of the soldered joint.

Another soldering technique, non-contact laser soldering, provides some advantages over contact soldering techniques. With non-contact laser soldering, the laser beam can strike a larger area of the components to be joined, therefore decreasing the temperature gradient within and between those components. However, in applications where the laser beam is prevented from directly striking one of the components, a temperature gradient still results between the components.

Additional problems in the general practice of soldering can include positioning and guiding the solder wire to the desired location relative to the components to be joined. This is especially a problem in applications requiring automation, rather than manpower. While humans can manually adjust the location of the solder wire to attain the desired solder flow, achieving this control within an automated system is complicated and very expensive.

The invention provides for significant improvement to a method of soldering metallic terminals. The invention provides a method of soldering using a non-contacting heat source, such as a laser, to heat the components to be joined. The components are configured to aid in their heating and to guide the solder wire to an optimum location with respect to the components.

More specifically, the invention provides a method of joining together first and second electrical terminals. The method includes providing the second terminal with an aperture extending therethrough, positioning the first and second terminals in overlapping relationship with one another to provide access to the first terminal through the aperture in the second terminal, applying heat to the first terminal through the aperture in the second terminal to heat the first and second terminals, and positioning a solder wire in engagement with at least one of the heated first and second terminals to melt the solder wire and to form a solder pool that contacts the first and second terminals. This method substantially improves the heat transfer through the terminals and decreases the temperature gradient throughout and between the terminals, thereby improving the quality of the soldered joint.

In one aspect of the invention, applying heat includes directing a beam through the aperture to strike the first terminal and having at least a portion of the beam reflect off the first terminal to strike the second terminal adjacent the aperture to heat the second terminal. The beam can be generated by suitable lasers, including a solid-state laser, a gas laser, an excimer laser, a dye laser, or a semiconductor laser.

In another aspect of the invention, the first terminal is coupled to a fuel injector and the method further includes placing the fuel injector in a fixture to secure the fuel injector before applying heat to the first and second terminals. The second terminal is coupled to a retainer clip and the method further includes placing the retainer clip on the fuel injector to position the second terminal in overlapping relationship with the first terminal.

The invention also provides another method of joining together first and second electrical terminals. The method includes providing the second terminal with a notch therein, positioning the first and second terminals in overlapping relationship with one another so the notch overlaps the first terminal, providing a solder wire having an end, positioning the end of the solder wire in engagement with the notch of the second terminal to locate the solder wire with respect to the terminals, and melting the solder wire to form a solder pool that contacts the first and second terminals. This method provides a guide for the solder wire so that the solder flow is consistently developed in the desired location.

In one aspect of the invention, positioning the end of the solder wire in the notch includes feeding the solder wire from a solder feeding machine. The notch is sized to receive the end of the solder wire.

The invention further provides a method of joining together first and second electrical terminals using a combination of the methods described above. The method includes providing the second terminal with an aperture extending therethrough and a notch therein, positioning the first and second terminals in overlapping relationship with one another so the aperture overlaps the first terminal to provide access to the first terminal through the second terminal and so the notch overlaps the first terminal, applying heat to the first terminal through the aperture in the second terminal to heat the first and second terminals, providing a solder wire having an end, positioning the end of the solder wire in engagement with the notch of the heated second terminal to locate the solder wire with respect to the terminals, and to melt the solder wire to form a solder pool that contacts the first and second terminals.

Other features and advantages of the invention will become apparent to those skilled in the art upon review of the following detailed description, claims, and drawings.

Figure 1:
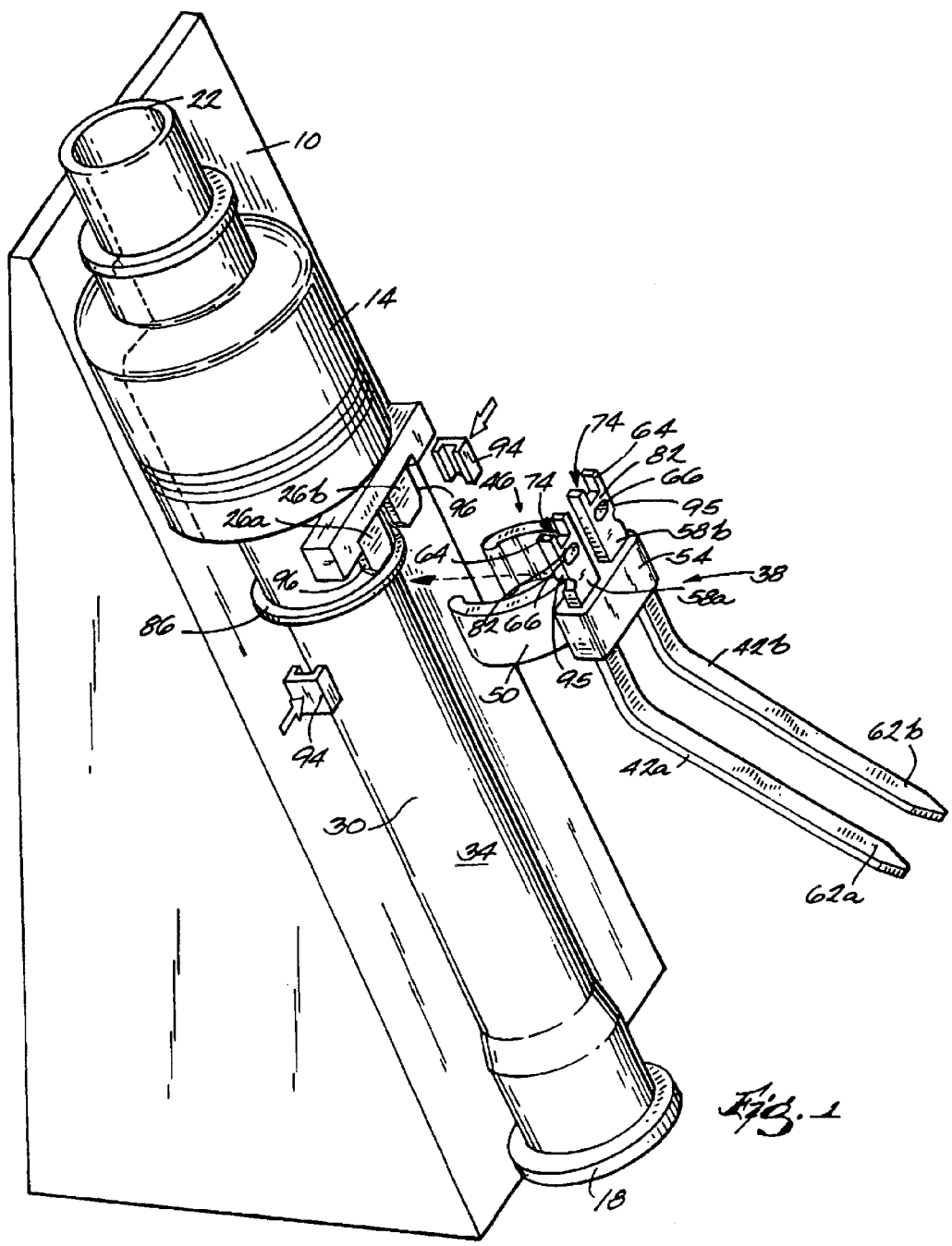
FIG. 1 is a partially-exploded perspective view of a fuel injector and a connector terminal assembly embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

The invention is embodied in a method and system of soldering together metallic terminals. While the method and system are shown and described as being applied to the manufacture of fuel injectors, those skilled in the art will recognize that the soldering method and system of the invention can be applied to the manufacture of other articles or devices having electrical terminals or other components that require soldering. In the embodiment described below, the soldering method and system of the invention is fully automated, however, those skilled in the art will recognize that some or all of the method could also be carried out manually without deviating from the invention.

The soldering system and method of the invention can stand alone, or can be one of a plurality of stages in a manufacturing and/or assembly line. For the purposes of this description, only the soldering stage will be described with the understanding that additional manufacturing and/or assembly processes can be carried out both upstream and downstream of the soldering stage.

Referring now to FIG. 1, at the beginning of the soldering stage a workpiece is supported by a fixture, or workpiece carrier 10. In an automated system, multiple workpiece carriers 10 are disposed on a conveyor belt (not shown). The conveyor belt transports each workpiece carrier 10 and its accompanying workpiece through a soldering station (not shown). In the illustrated embodiment, the workpiece is a Bosch model number "EV14" fuel injector 14 available from the Robert Bosch Corporation. Those skilled in the art, however, will recognize that the soldering method and system can also be practiced with other fuel injector models, or with other devices that require soldering of components.

Figure 2:
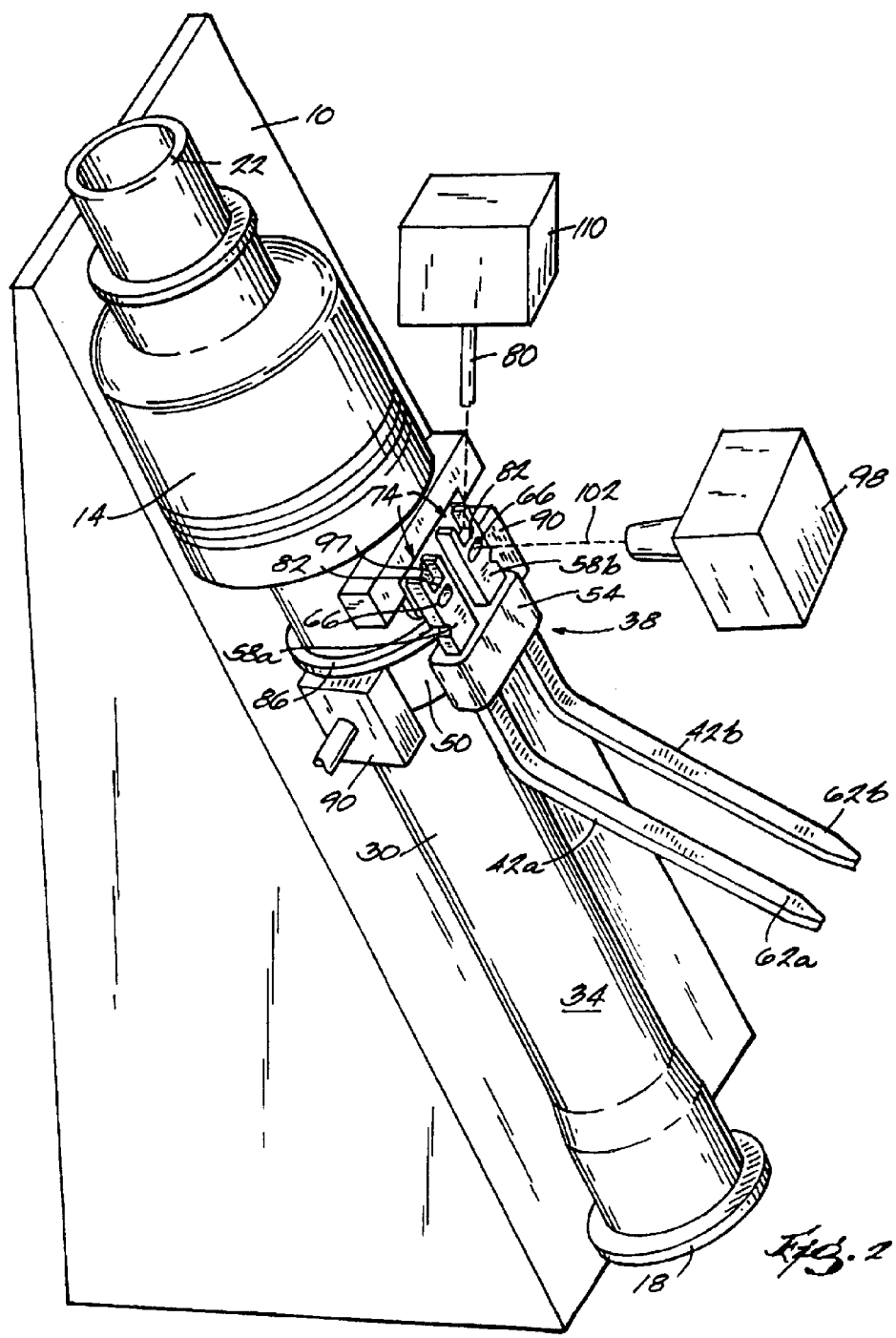
FIG. 2 is a perspective view of the fuel injector and connector terminal assembly of FIG. 1, illustrating a terminal portion of a connector terminal being soldered to an injector terminal.

The illustrated fuel injector 14 includes an inlet end 18, an outlet end 22, and a pair of injector terminals 26a, 26b that are intermediate the inlet end 18 and outlet end 22, and that are electrically connected to the electromagnetic coil (not shown) of the fuel injector 14, as is understood in the art. The illustrated injector terminals 26a, 26b are each about 2 mm wide and about 3.5 mm long. The inlet end 18 of the illustrated injector 14 is defined in part by an extension tube 30 having an outer cylindrical surface 34. As seen in FIGS. 1 and 2, the workpiece carrier 10 supports the fuel injector 14 in an inclined orientation relative to horizontal so that the inlet end 18 is oriented generally vertically below the outlet end 22. While the angle of incline from horizontal can vary, angles of between about 15° to 75° from horizontal can be used with about 45° being preferred.

Either before the injector 14 is placed in the workpiece carrier 10, or while the injector 14 is supported in the workpiece carrier 10, a connector terminal assembly 38 is attached to the fuel injector 14. The connector terminal assembly 38 includes a pair of connector terminals 42a, 42b molded into a plastic retainer clip 46. The retainer clip 46 includes a clip portion 50 and a body portion 54. The clip portion 50 is generally C-shaped and is sized to be mounted on the outer cylindrical surface 34 of the extension tube 30. The body portion 54 is generally rectangularly shaped and supports the connector terminals 42a, 42b.

As shown in FIG. 1, the connector terminals 42a, 42b include respective terminal portions 58a, 58b extending in one direction from the retainer clip 46, and respective terminal portions 62a, 62b extending in the opposite direction from the retainer clip 46. The terminal portion 62a, 62b of each connector terminal 42a, 42b is sized and configured as desired to extend to the location where an external power supply (not shown) is connected to the fuel injector 14 (typically at an overmolded connector socket—not shown). As a result, the terminal portions 62a, 62b can be made in a variety of shapes. The terminal portion 58a, 58b of each illustrated connector terminal 42a, 42b is about 2 mm wide to substantially correspond to the width of the injector terminals 26a, 26b. The terminal portions 58a, 58b are each about 5.5 mm long from a distal end 64 to the point where each terminal portion 58a, 58b extends from the body portion 54 of the retainer clip 46. Those skilled in the art will recognize that the dimensions given for the injector terminals 26a, 26b and connector terminals 42a, 42b can be varied as desired depending on the specific fuel injector 14 or other device being soldered.

Figure 3:
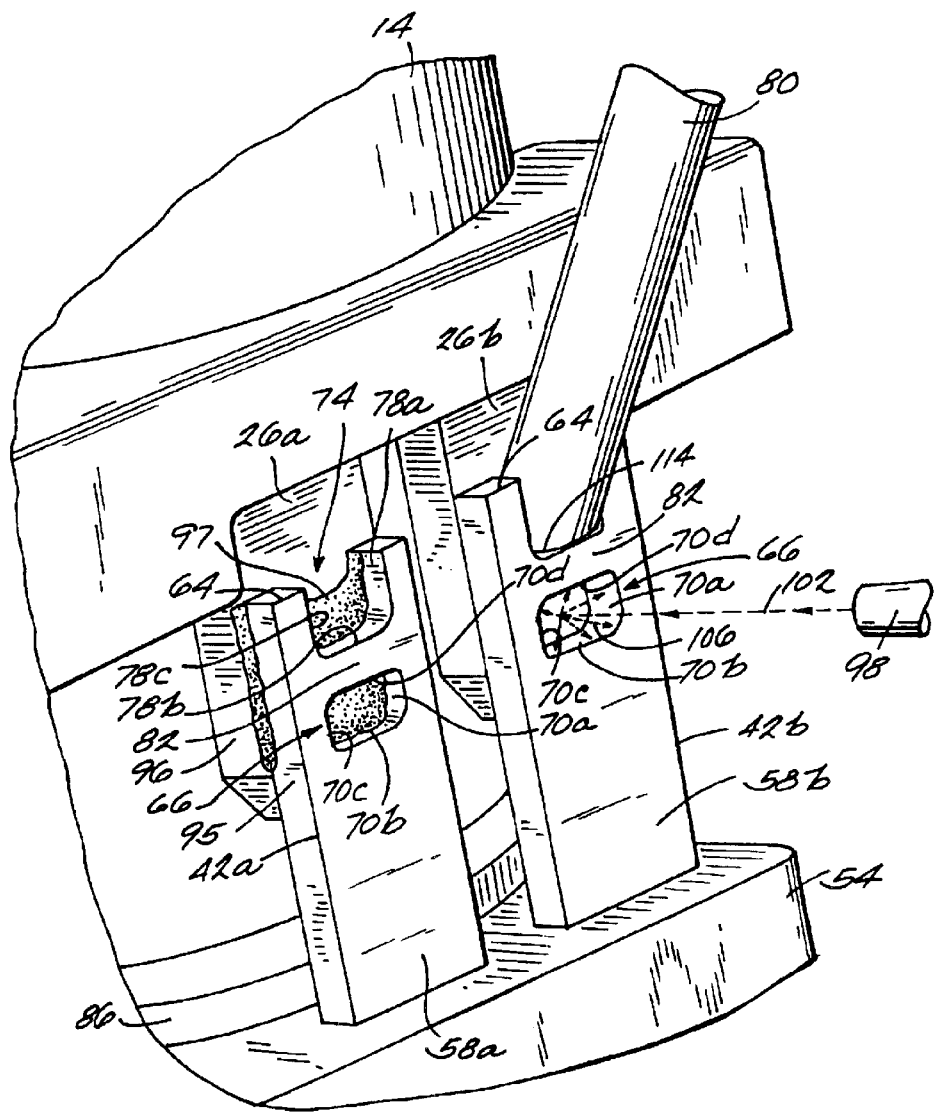
FIG. 3 is an enlarged perspective view of the injector terminals and connector terminals shown in FIGS. 1–2, illustrating a soldered pair of terminals and a pair of terminals in the process of being soldered.

As best seen in FIG. 3, the terminal portions 58a, 58b further include respective apertures 66 that extend through the entire thickness of the connector terminals 42a, 42b. Each illustrated aperture 66 is generally rectangular in shape and is defined by four interior sidewalls 70a–70d. Also, each aperture 66 is about 1.5 mm wide and about 0.75 mm long. Other sizes and shapes can be used for the aperture 66. The aperture 66 can be formed using any suitable machining techniques, including, but not limited to, stamping, punching, cutting, grinding, milling, and the like.

The terminal portions 58a, 58b also include respective notches 74 formed in the respective distal ends 64. Like the apertures 66, the notches 74 extend through the entire thickness of the connector terminals 42a, 42b. As best seen in FIG. 3, each illustrated notch 74 is defined by three interior sidewalls 78a–78c. Also, each notch 74 is about 1.5 mm wide and about 1.4 mm long. Other sizes and shapes can be used for the notch 74. The notch 74 can be formed using any suitable machining techniques, including, but not limited to, stamping, punching, cutting, grinding, milling, and the like.

The aperture 66 and the notch 74 of terminal portions 58a, 58b are positioned such that a strip 82 separates the notch 74 and the aperture 66 on each respective connector terminal 42a, 42b. As will be described in more detail below, the separation between the aperture 66 and the notch 74 helps ensure that the heat source does not directly contact or strike the solder wire 80 used for soldering together the terminals 26a, 42a, and 26b, 42b. The dimensions of the strip 82 can vary as dictated by the dimensions of the connector terminals 42a, 42b, the apertures 66, and the notches 74.

The connector terminal assembly 38 is installed on the injector 14 by first snapping or sliding the clip portion 50 of the retainer clip 46 onto the extension tube 30. The retainer clip 46 is then positioned on the outer cylindrical surface 34 so that the terminal portions 58a, 58b of the connector terminals 42a, 42b are generally aligned with and in overlapping relationship with the injector terminals 26a, 26b, respectively, in preparation for soldering. For reasons that will become evident below, the overlapping relationship will include the terminal portions 58a, 58b of the connector terminals 42a, 42b being positioned outside or on top of the injector terminals 26a, 26b with respect to the fuel injector 14. The terms "outside", "top", "bottom", "under", "over", and the like, as used herein and in the appended claims, are for purposes of description only and are not intended to imply any particular orientation.

In order to achieve the desired overlapping relationship of the connector terminals 42a, 42b and the injector terminals 26a26b, the retainer clip 46 (and therefore the connector terminals 42a, 42b) is both axially and rotationally aligned on the fuel injector 14 relative to the injector terminals 26a, 26b. For axial alignment, the fuel injector 14 includes a shoulder 86 that provides a stop or abutment surface against which the clip portion 50 is positioned. In the illustrated embodiment, the shoulder 86 is defined by the interface where the extension tube 30 is inserted into the main body of the injector 14. When the clip portion 50 abuts the shoulder 86 on the injector 14, there is about a 3 mm axial overlap of the terminal portions 58a, 58b and the injector terminals 26a, 26b. Moving the retainer clip 46 along the outer cylindrical surface 34 of the extension tube 30 and into abutting relation with the shoulder 86 will occur sometime prior to the actual soldering process, and can occur immediately when the retainer clip 46 is placed on the injector 14 or anywhere else during the automated process upstream of the soldering station. In the illustrated embodiment, axial alignment of the connector terminal assembly 38 occurs before the fuel injector 14 is placed on the workpiece carrier 10.

During installation of the connector terminal assembly 38 onto the injector 14, the connector terminal assembly 38 is also generally oriented in rotational alignment with respect to the injector 14 to achieve the desired overlapping relationship of the terminal portions 58a, 58b and the injector terminals 26a, 26b. Once the connector terminal assembly 38 is mounted on the injector 14, the workpiece, comprised of the injector 14 and the attached connector terminal assembly 38, is placed in the workpiece carrier 10. Each workpiece carrier 10 includes (see FIGS. 1 and 2) a first pair of side arms 90 that engage opposite sides of the retainer clip 46 for substantially preventing unwanted movement (both axial and rotational) of the clip 46. The first pair of side arms 90 engage the retainer clip 46 along the clip portion 50 and are resiliently biased to engage opposite sides of the clip portion 50, and as a result, the side arms 90 must be actuated to disengage the clip portion 50. Any suitable fixture or workpiece carrier 10 that performs these steps may be used to support the workpiece, comprising the fuel injector 14 and connector terminal assembly 38.

Sometime after the fuel injector 14 is placed in the workpiece carrier 10, and prior to soldering, rotational alignment of the terminal portions 58a, 58b and the injector terminals 26a, 26b is performed. This rotational alignment ensures the proper overlapping relationship between the terminal portions 58a, 58b and injector terminals 26a, 26b, relative to their width dimensions. The rotational alignment is accomplished using (see FIG. 1) a second pair of side arms 94 that engage outer side surfaces 95 of terminal portions 58a, 58b, and outer side surfaces 96 of the injector terminals 26a, 26b to rotate the clip portion 50 on the outer cylindrical surface 34 of the injector 14. In the illustrated embodiment, the workpiece carrier 10 encounters the second pair of side arms 94 upstream of the soldering station.

Before the second pair of side arms 94 engages the respective terminal portions 58a, 58b and injector terminals 26a, 26b, the first pair of side arms 90 on the workpiece carrier 10 is disengaged from the clip portion 50 by a mechanism (not shown) engaged by the workpiece carrier 10 as the workpiece carrier 10 moves with the conveyor belt. After the first pair of side arms 90 is disengaged, the second pair of side arms 94 moves into position to engage the respective terminal portions 58a, 58b and injector terminals 26a, 26b. As shown in FIG. 1, the arms of the second pair of side arms 94 move equidistantly toward one another to engage the outer side surfaces 95 of terminal portions 58a, 58b, and the outer side surfaces 96 of the injector terminals 26a, 26b. This action rotates the retainer clip 46 on the extension tube 30 to rotationally align the respective terminal portions 58a, 58b with the injector terminals 26a, 26b for soldering.

Next, the second pair of side arms 94 disengages the respective terminal portions 58a, 58b and injector terminals 26a, 26b, and the first pair of side arms 90 is again biased to engage the clip portion 50 to secure the retainer clip 46 in an aligned orientation on the fuel injector 14 (see FIG. 2). FIG. 1 illustrates the connector terminal assembly 38 exploded from the extension tube 30, however, as previously explained, the connector terminal assembly 38 is attached to the extension tube 30 of the fuel injector 14 upon rotational alignment. The connector terminal assembly 38 is shown exploded from the extension tube 30 for illustrative purposes only.

Generally, both axial and rotational alignment of the terminals 26a, 42a, and 26b, 42b is required before the terminals 26a, 42a, and 26b, 42b can be soldered. This process can occur at any point along the conveyor belt before the fuel injector 14 reaches the soldering station. For example, the mechanisms that initiate axial and rotational alignment can be positioned in the soldering station, or immediately upstream of the soldering station, such that only a short distance and/or time period exists between alignment and soldering.

When the injector terminals 26a, 26b and terminal portions 58a, 58b are properly aligned, the overlapping relationship between the terminal portions 58a, 58b and the injector terminals 26a, 26b is such that the aperture 66 and notch 74 of each of the terminal portions 58a, 58b completely overlap or overlie the respective injector terminals 26a, 26b. In other words, when the terminal portions 58a, 58b and the injector terminals 26a, 26b are in overlapping relationship, each aperture 66 provides access through the respective terminal portion 58a, 58b to the respective underlying injector terminal 26a, 26b. Likewise, each notch 74 provides access to the respective underlying injector terminal 26a, 26b. As previously mentioned, the illustrated axial overlap between the terminal portion 58a, 58b and the injector terminals 26a, 26b is about 3 mm, recognizing that the amount of axial overlap can vary as desired.

Also, a small gap (not shown) exists between the respective injector terminals 26a, 26b and terminal portions 58a, 58b after axial and rotational alignment. The target gap is between about 0.2 mm and 0.25 mm; however, during production, the range of acceptable values widens between about 0.1 mm and 0.4 mm. The gap allows melted solder wire 80 to flow between the respective injector terminals 26a, 26b and terminal portions 58a, 58b. Thus, upon cooling and solidification, a soldered joint 97 is formed that electrically and mechanically connects the respective injector terminals 26a, 26b and terminal portions 58a, 58b. Alternatively, the respective injector terminals 26a, 26b and terminal portions 58a, 58b may be positioned in overlapping engagement such that no gap exists between the respective injector terminals 26a, 26b and terminal portions 58a, 58b. Therefore, melted solder wire 80 may only flow within the notches 74 of the terminal portions 58a, 58b to electrically and mechanically connect the respective injector terminals 26a, 26b and terminal portions 58a, 58b near the interface of the notches 74 and respective injector terminals 26a, 26b.

After axial and rotational alignment of the connector terminal assembly 38, the fuel injector 14 is transported to a soldering position within the soldering station, where the injector terminal 26a and terminal portion 58a are soldered together in the manner described below with respect to the injector terminal 26b and terminal portion 58b. After the terminal portion 58a and the injector terminal 26a are soldered together to form the soldered joint 97, the fuel injector 14 is transported by the conveyor belt so that terminal portion 58a and injector terminal 26a are moved away from the soldering position, and terminal portion 58b and injector terminal 26b are moved to the soldering position for soldering. FIGS. 2–3 illustrate the injector terminal 26b and terminal portion 58b in the soldering position with the soldered joint 97 already completed between injector terminal 26a and terminal portion 58a. Alternatively, dual soldering stations may exist such that respective injector terminals 26a, 26b and terminal portions 58a, 58b may be soldered together simultaneously, rather than separately.

The soldering process will now be described with respect to the injector terminal 26b and terminal portion 58b. As shown schematically in FIG. 2, a heat source, such as a laser 98, is fixedly positioned relative to the ground while the conveyor belt transports the fuel injector 14 relative to the laser 98. When the injector terminal 26b and terminal portion 58b are in the soldering position, a beam 102 emanating from the laser 98 will be substantially perpendicular to the outside surface of the terminal portion 58b, and will pass through the aperture 66 to strike the injector terminal 26b. Alternatively, the laser 98 may be positioned at any other angle relative to the terminal portion 58b, provided the beam 102 will pass through the aperture 66 and strike the injector terminal 26b. The laser 98 can be any commercially available laser capable of being used for the laser soldering process, including, but not limited to, a solid-state laser, a gas laser, an excimer laser, a dye laser, and a semiconductor laser. Alternatively, if dual soldering stations (not shown) are to be used, a second laser (not shown) will be positioned in the second soldering station similarly to the laser 98 in the first soldering station.

The laser 98 is configured to substantially concentrate the laser beam 102 through the aperture 66 in the terminal portion 58b such that the laser beam 102 is directly striking the injector terminal 26b. Between about 10% and 30%, and believed to be about 20%, of the energy of the laser beam 102 is absorbed by the injector terminal 26b, thereby directly heating the injector terminal 26b. A portion of the laser beam 102 is diffusively reflected (see FIG. 3) by the surface of the injector terminal 26b and strikes the sidewalls 70a–70d that define the aperture 66, thereby also heating the terminal portion 58b. The reflected portion 106 of the beam 102 contains the balance of the beam's energy, between about 70% and 90%, and believed to be about 80%. Also, some of the reflected portion 106 of the beam and its associated heat energy will be lost to the environment. The configuration and method shown in FIG. 3 promotes a substantially homogenous heating of both the terminal portion 58b and the injector terminal 26b, which decreases the temperature gradient throughout and between the injector terminal 26b and terminal portion 58b. As a result, solder flow between the terminal portion 58b and the injector terminal 26b is promoted and a higher quality soldered joint 97 is possible.

The soldering station further includes a source of solder wire 80, such as a solder feeding machine 110, which is shown schematically in FIG. 2. Any suitable automatic solder feeding machine 110 can be used as the source of solder wire 80. Like the laser 98, the solder feeding machine 110 is fixedly positioned relative to the ground, while the conveyor belt transports the fuel injector 14 relative to the solder feeding machine 110. When the injector terminal 26b and terminal portion 58b are in the soldering position, the solder wire 80 is fed automatically from the solder feeding machine 110. The solder wire 80 is fed at an angle relative to the injector terminal 26b and terminal portion 58b, however, the solder wire 80 is preferably fed substantially vertically relative to the conveyor belt so that gravity can facilitate the feeding of the solder wire 80 and the subsequent solder flow. Typically, solder wire 80 having a diameter between about 0.5 mm and 1.5 mm is used. As shown in FIG. 3, the end 114 of the solder wire 80 is fed to the injector terminal 26b and terminal portion 58b such that the end 114 of the solder wire 80 substantially engages both the injector terminal 26b and the notch 74 of the terminal portion 58b. The sidewalls 78a–78c guide and locate the end of the solder wire 80 into position with respect to the injector terminal 26b and terminal portion 58b. Alternatively, if dual soldering stations (not shown) are to be used, a second solder feeding machine (not shown) will be positioned in the second soldering station similarly to the solder feeding machine 110 in the first soldering station.

Upon the laser beam 102 striking the injector terminal 26b and the terminal portion 58b, only about 500 milliseconds are required to achieve a substantially homogeneous temperature distribution between the injector terminal 26b and terminal portion 58b. The solder wire 80 is then fed to the injector terminal 26b and terminal portion 58b such that the solder wire 80 is guided to the proper location by the notch 74. Soon after contacting the interface between the injector terminal 26b and the sidewalls 78a–78c of the notch 74, the solder wire 80 melts and forms a solder pool (not shown). Through the wetting behavior of the solder pool, the solder pool spreads over and between the injector terminal 26b and terminal portion 58b. After about two seconds, the solder wire 80 is removed and the laser 98 is deactivated. Then, within about 500 milliseconds, the solder pool cools to form a soldered joint 97. The separation strip 82 of the terminal portion 58b ensures that the laser beam 102 does not directly strike the end 114 of the solder wire 80.

After the terminal portions 58a, 58b have been soldered to the respective injector terminals 26a, 26b, the fuel injector 14 is transported by the conveyor belt away from the soldering station to various additional assembly, manufacturing, and/or testing stations.

The terminal portions 58a, 58b, as previously described, preferably embody both an aperture 66 and a notch 74 as features to aid in the method of soldering of the present invention. However, those skilled in the art will recognize that either feature may be used independently of one another in alternate embodiments of the present invention. In one alternate embodiment of the present invention (not shown), the terminal portions 58a, 58b only include apertures 66 therein to allow a beam 102 to pass through the apertures 66 and strike the injector terminals 26a, 26b to achieve the homogeneous heating described above. After the terminal portions 58a, 58b and injector terminals 26a, 26b are heated by the beam 102, solder wire 80 is fed to the terminal portions 58a, 58b and injector terminals 26a, 26b in any suitable manner, such that the solder wire 80 (and subsequent solder pool) comes into contact with both terminal portion 58a and injector terminal 26a, and both terminal portion 58b and injector terminal 26b.

In another alternate embodiment of the present invention (not shown), the terminal portions 58a, 58b only include notches 74 therein to guide the solder wire 80 as it is fed to the respective terminal portions 58a, 58b and injector terminals 26a, 26b. The terminal portions 58a, 58b and injector terminals 26a, 26b may be heated by a non-contacting heat source, such as the previously described beam 102, or a contacting heat source, such as a soldering iron (not shown), prior to application of the solder wire 80.

Various features of the invention are set forth in the following claims.

We claim:

1. A method of joining together first and second electrical terminals, the method comprising:
   providing the second terminal with an aperture extending therethrough;
   positioning the first and second terminals in overlapping relationship with one another to provide access to the first terminal through the aperture in the second terminal;
   applying heat to the first terminal through the aperture in the second terminal to heat the first and second terminals; and
   positioning a solder wire in engagement with at least one of the heated first and second terminals to melt the solder wire and to form a solder pool that contacts the first and second terminals;
   wherein the first terminal is coupled to a fuel injector, and wherein the method further comprises placing the fuel injector in a fixture to secure the fuel injector before applying heat to the first and second terminals.

2. The method of claim 1, wherein the second terminal is coupled to a retainer clip, and wherein the method further comprises placing the retainer clip on the fuel injector to position the second terminal in overlapping relationship with the first terminal.

3. A method of joining together first and second electrical terminals, the method comprising:
   providing the second terminal with an aperture extending therethrough;
   positioning the first and second terminals in overlapping relationship with one another to provide access to the first terminal through the aperture in the second terminal;
   applying heat to the first terminal through the aperture in the second terminal to heat the first and second terminals; and
   positioning a solder wire in engagement with at least one of the heated first and second terminals to melt the solder wire and to form a solder pool that contacts the first and second terminals;
   wherein providing the second terminal with an aperture includes forming the aperture with a length and a width, the width being equal to about double the length.

4. The method of claim 3, wherein the aperture is provided with a length of about 0.75 mm and a width of about 1.5 mm.

5. A method of joining together first and second electrical terminals, the method comprising:
   providing the second terminal with an aperture extending therethrough;
   positioning the first and second terminals in overlapping relationship with one another to provide access to the first terminal through the aperture in the second terminal;
   applying heat to the first terminal through the aperture in the second terminal to heat the first and second terminals; and
   positioning a solder wire in engagement with at least one of the heated first and second terminals to melt the solder wire and to form a solder pool that contacts the first and second terminals;
   wherein applying heat includes directing a beam through the aperture to strike the first terminal; and
   wherein the beam includes one of a solid-state laser, a gas laser, an excimer laser, a dye laser, and a semiconductor laser.

6. A method of joining together first and second electrical terminals, the method comprising:
   providing the second terminal with a notch therein;
   positioning the first and second terminals in overlapping relationship with one another, the notch overlapping the first terminal;
   providing a solder wire having an end;
   positioning the end of the solder wire in engagement with the notch of the second terminal to locate the solder wire with respect to the terminals; and
   melting the solder wire to form a solder pool that contacts the first and second terminals.

7. The method of claim 6, wherein the first terminal is coupled to a fuel injector, and wherein the method further comprises placing the fuel injector in a fixture to secure the fuel injector before positioning the first and second terminals in overlapping relationship.

8. The method of claim 7, wherein the second terminal is coupled to a retainer clip, and wherein the method further comprises placing the retainer clip on the fuel injector to position the second terminal in overlapping relationship with the first terminal.

9. The method of claim 6, wherein providing a second terminal with a notch includes forming the notch with a width and a length, the width being about equal to length.

10. The method of claim 9, wherein the notch is provided with a width of about 1.5 mm and a length of about 1.4 mm.

11. The method of claim 10, wherein providing a solder wire includes providing a solder wire having a diameter between about 0.5 mm and 1.5 mm, and wherein the notch has a width selected to receive the end of the solder wire.

12. The method of claim 6, wherein positioning the end of the solder wire in the notch includes feeding the solder wire from a solder feeding machine.

13. A method of joining together first and second electrical terminals, the method comprising:

providing the second terminal with an aperture extending therethrough and a notch therein;

positioning the first and second terminals in overlapping relationship with one another, the aperture overlapping the first terminal to provide access to the first terminal through the second terminal and the notch overlapping the first terminal;

applying heat to the first terminal through the aperture in the second terminal to heat the first and second terminals;

providing a solder wire having an end;

positioning the end of the solder wire in engagement with the notch of the heated second terminal to locate the solder wire with respect to the terminals and to melt the solder wire to form a solder pool that contacts the first and second terminals.

14. The method of claim 13, wherein the first terminal is coupled to a fuel injector, and wherein the method further comprises placing the fuel injector in a fixture to secure the fuel injector before applying heat to the first and second terminals.

15. The method of claim 13, wherein the second terminal is coupled to a retainer clip, and wherein the method further comprises placing the retainer clip on the fuel injector to position the second terminal in overlapping relationship with the first terminal.

16. The method of claim 13, wherein providing the second terminal with an aperture includes forming the aperture with a length and a width, the width being equal to about double the length.

17. The method of claim 13, wherein providing the second terminal with a notch includes forming the notch with a width and a length, the width being about equal to the length, and wherein the notch has a width selected to receive the end of the solder wire.

18. The method of claim 13, wherein applying heat includes directing a beam through the aperture to strike the first terminal.

19. The method of claim 18, wherein applying heat includes having at least a portion of the beam reflect off the first terminal and strike the second terminal adjacent the aperture to heat the second terminal.

20. The method of claim 18, wherein the beam includes one of a solid-state laser, a gas laser, an excimer laser, a dye laser, and a semiconductor laser.

21. A method of joining together first and second electrical terminals, the method comprising:

providing the second terminal with an aperture extending therethrough;

positioning the first and second terminals in overlapping relationship with one another to provide access to the first terminal through the aperture in the second terminal, no portion of the first terminal extending into the aperture;

applying heat to the first terminal through the aperture in the second terminal to heat the first and second terminals; and positioning a solder wire in engagement with at least one of the heated first and second terminals to melt the solder wire and to form a solder pool that contacts the first and second terminals.

22. The method of claim 21, wherein the first terminal is coupled to a fuel injector, and wherein the method further comprises placing the fuel injector in a fixture to secure the fuel injector before applying heat to the first and second terminals.

23. The method of claim 22, wherein the second terminal is coupled to a retainer clip, and wherein the method further comprises placing the retainer clip on the fuel injector to position the second terminal in overlapping relationship with the first terminal.

24. The method of claim 21, wherein providing the second terminal with an aperture includes forming the aperture with a length and a width, the width being equal to about double the length.

25. The method of claim 24, wherein the aperture is provided with a length of about 0.75 mm and a width of about 1.5 mm.

26. The method of claim 21, wherein applying heat includes directing a beam through the aperture to strike the first terminal, and wherein the beam includes one of a solid-state laser, a gas laser, an excimer laser, a dye laser, and a semiconductor laser.

27. A method of joining together first and second electrical terminals, the terminals each including a planar surface, the method comprising:

providing the second terminal with an aperture extending therethrough;

positioning the first and second terminals in overlapping relationship with one another such that the planar surfaces of the terminals are in closely spaced relation, thereby providing access to the first terminal through the aperture in the second terminal;

applying heat to the first terminal through the aperture in the second terminal to heat the first and second terminals; and positioning a solder wire in engagement with at least one of the heated first and second terminals to melt the solder wire and to form a solder pool that contacts the first and second terminals.

28. The method of claim 27, wherein the first terminal is coupled to a fuel injector, and wherein the method further comprises placing the fuel injector in a fixture to secure the fuel injector before applying heat to the first and second terminals.

29. The method of claim 28, wherein the second terminal is coupled to a retainer clip, and wherein the method further comprises placing the retainer clip on the fuel injector to position the second terminal in overlapping relationship with the first terminal.

30. The method of claim 27, wherein providing the second terminal with an aperture includes forming the aperture with a length and a width, the width being equal to about double the length.

31. The method of claim 30, wherein the aperture is provided with a length of about 0.75 mm and a width of about 1.5 mm.

32. The method of claim 27, wherein applying heat includes directing a beam through the aperture to strike the first terminal, and wherein the beam includes one of a solid-state laser, a gas laser, an excimer laser, a dye laser, and a semiconductor laser.

* * * * *